United States Patent
Preijert (10) Patent No.: US 9,108,483 B2
(45) Date of Patent: Aug. 18, 2015

(54) VEHICLE SUSPENSION COMPRISING LIGHT WEIGHT LEAF SPRING ASSEMBLY

(75) Inventor: Stefan Preijert, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/375,074

(22) PCT Filed: Jan. 31, 2012

(86) PCT No.: PCT/SE2012/000010
§ 371 (c)(1),
(2), (4) Date: Jul. 28, 2014

(87) PCT Pub. No.: WO2013/115685
PCT Pub. Date: Aug. 8, 2013

(65) Prior Publication Data
US 2014/0353936 A1    Dec. 4, 2014

(51) Int. Cl.
*B60G 11/34* (2006.01)
*B60G 11/04* (2006.01)
*F16F 1/26* (2006.01)
(Continued)

(52) U.S. Cl.
CPC  *B60G 11/04* (2013.01); *B60G 9/00* (2013.01); *B60G 11/10* (2013.01); *B60G 11/12* (2013.01); *F16F 1/26* (2013.01); *F16F 1/38* (2013.01); *B60G 2200/31* (2013.01); *B60G 2202/112* (2013.01); *B60G 2204/121* (2013.01); *B60G 2204/4306* (2013.01);
(Continued)

(58) Field of Classification Search
CPC ........ B60G 11/34; B60G 11/36; B60G 11/46; B60G 11/04; B60G 11/12; B60G 11/113; B60G 11/10; B60G 2206/428; B60G 2202/112; B60G 2204/121; B60G 2204/4402; B60G 2204/44; F16F 1/26
See application file for complete search history.

(56) References Cited

U.S. PATENT DOCUMENTS

| 4,519,591 A | 5/1985 | Bush et al. |
| 5,209,518 A * | 5/1993 | Heckenliable et al. ....... 280/680 |

(Continued)

FOREIGN PATENT DOCUMENTS

| GB | 191319357 A | 0/1914 |
| JP | 61002932 A | 1/1986 |

(Continued)

OTHER PUBLICATIONS

International Search Report (Oct. 23, 2012) for corresponding Internation application No. PCT/SE2012/000010.

(Continued)

*Primary Examiner* — Drew Brown
(74) *Attorney, Agent, or Firm* — WRB-IP LLP (57) ABSTRACT

A vehicle suspension leaf spring assembly is arranged to be mounted in the longitudinal direction of the vehicle on opposite sides thereof. The leaf spring assembly has a first end, which is arranged for pivotal connection to a first bracket on the vehicle; and a second end, which is arranged for connection to a spring shackle on the vehicle. The leaf spring assembly is arranged to be connected to an axle extending transversely of the leaf spring assembly at a position intermediate the first and second ends of the leaf spring assembly. The leaf spring assembly includes two individual leaf springs arranged side-by-side with a predetermined spacing and extending between the first and second ends.

13 Claims, 5 Drawing Sheets

(51) Int. Cl.
*B60G 9/00* (2006.01)
*B60G 11/10* (2006.01)
*B60G 11/12* (2006.01)
*F16F 1/38* (2006.01)

(52) U.S. Cl.
CPC ...... *B60G 2206/428* (2013.01); *B60G 2206/71* (2013.01); *B60G 2206/7101* (2013.01)

(56) References Cited

U.S. PATENT DOCUMENTS 6,118,083 A 9/2000 Boyovich et al.
2006/0113744 A1 6/2006 Preijert
2013/0241167 A1* 9/2013 Perri et al. ............. 280/124.134

FOREIGN PATENT DOCUMENTS

JP 3125039 A 5/1991
WO 2006121438 A2 11/2006

OTHER PUBLICATIONS

International Preliminary Report on Patentability (May 2, 2014) for International application No. PCT/SE2012/000010.

* cited by examiner

VEHICLE SUSPENSION COMPRISING LIGHT WEIGHT LEAF SPRING ASSEMBLY

BACKGROUND AND SUMMARY

This invention relates to a vehicle suspension comprising leaf springs, in particular a suspension for a commercial vehicle, and a leaf spring for use in such a suspension.

In general, most commercial vehicles with a frame comprising longitudinal beams are equipped with steerable, single, tandem or multi-axle assemblies.

Conventionally, the suspension systems provided for supporting and damping the relative movement between each axle and the vehicle frame have included single-stage multileaf springs, pneumatic spring systems or a combination thereof. Many vehicles are equipped with single-stage multileaf springs which are designed to mechanically dampen the movement between the frame and die axles during operation of the vehicle.

It is common to support such a vehicle with a leaf spring which is attached at each end to the vehicle chassis and to an axle near the centre of the spring. In such an arrangement, when the suspension is loaded, the maximum bending moment in the spring occurs at the point where the axle is attached to the spring and decreases in either direction from that point along the spring. In order to make the most efficient use of the spring material and to save weight, one option is to use a single leaf spring. The spring can be made tapered in either direction toward its ends from a point of maximum thickness where the axle is attached. In order to achieve acceptable deflection characteristics in a tapered spring, it is necessary that it be manufactured to a relatively high degree of accuracy. The cost of manufacturing a tapered steel leaf spring is relatively high because it requires the use of special tapered rolling machines. As a result, although tapered single leaf springs are generally available today for use with larger vehicles, such as heavy trucks, they are significantly more expensive than conventional flat springs.

Another important factor in the design of leaf spring suspensions is the desired spring rate. The spring rate, which is defined as the rate of increase of force necessary to deflect the spring with deflection, is a function of the cross-sectional area moment of inertia, the length of the spring, and the elastic modulus of the spring material. In general, a single leaf spring must be designed so that it is strong enough to withstand the loads imposed upon it in operation and yet have a spring rate which is low enough to provide acceptable ride qualities. Further, the desired spring rate must be achieved within the particular geometric constraints placed on the suspension, such as the maximum allowable length and deflection of the springs.

To achieve a compromise among these various design and economic factors, designers frequently use "built-up" steel spring assemblies which consist of a number of separate spring leaves diminishing in length from the top of the assembly to the bottom to achieve an overall tapered shape. Normally, the leaves are clamped together at their centres where the axle is mounted but are free to slip longitudinally relative to each other when the spring is deflected. The leaves are usually of constant thickness to reduce manufacturing costs, but use of tapered leaves obtains greater efficiency. As previously mentioned, however, the cost of manufacturing such tapered leaves is relatively high.

One of the principal deficiencies of a built-up steel spring assembly is its weight. Due to the dramatic increase in fuel costs in recent years and the consequent necessity to reduce vehicle weight, designers are examining all major vehicle components, including suspensions, to see if ways can be found to reduce their weight without adversely affecting their cost or performance. In particular, it has been suggested that much lighter and more efficient springs could be made from various state-of-the-art plastic or composite materials rather than steel. Some of these materials are particularly attractive for use in constructing springs with non-uniform cross-sections because of the ease with which they can be moulded.

In spite of these efforts, plastic and composite single leaf springs have not been used commercially for a variety of reasons. It is generally accepted that springs made entirely of plastic would be impractical because of excessive bulk and insufficient resistance to wear and impact. One known plastic spring, sold under the trademark GRAETEK by a division of Exxon Corp., is made from graphite skins with a glass fibre-reinforced epoxy core. This spring has proven impractical due to high cost and its extreme unidirectional stress-carrying capability. That is, the spring is strong, enough in the vertical direction but too weak in the transverse or torsional direction to be usable in common suspensions. Since vehicle springs must absorb cornering loads and high impact loads from rocks and other debris, graphite is unsatisfactory as a component of a viable leaf spring. Composites of metal and plastic have been suggested to alleviate some of these graphite problems. The cost of manufacturing these composite springs has this far been too great, however, to justify substituting them for all steel spring assemblies.

An additional drawback with single leaf springs is that the installation must be secured by a safety system or device at each end, in case of spring, failure. For a steered front axle, the front end is provided with a safety eye to block a front axle dislocation and the rear end is provided with a steel belt or blocker. Such a safety system increases both cost and weight and give a minor axle dislocation at spring breakage that could lead to problems to maintain steering control after a leaf spring breakage. After a spring breakage the vehicle can not be driven and must be towed to a service facility.

In the subsequent text, the vehicle referred to is a commercial type vehicle comprising a frame built up of a pair of substantially parallel beams, for instance beams with an I- or C-shaped cross-section. The suspension according to the invention is preferably, but not necessarily, intended for front wheel suspensions comprising steerable wheels. It should be noted that all distances referred to are taken when the vehicle is stationary and the suspension is in its unloaded state, unless otherwise specified.

The invention relates, according to an aspect thereof, to a leaf spring assembly for a vehicle suspension arranged to be mounted in the longitudinal direction of the vehicle, on both sides thereof. Each leaf spring assembly is attached on opposite sides of a chassis or frame and is arranged to support one end of a transverse rigid axle. The axle is preferably, but not necessarily, a steered vehicle axle.

The leaf spring assembly has a first end, which is arranged for pivotal connection to a first bracket on the vehicle and a second end, which is arranged for connection to a spring shackle on the vehicle. In a conventional vehicle suspension, the first bracket is a front spring hanger or bracket and the second bracket is a rear spring hanger or bracket. As indicated above, the leaf spring assembly is arranged to be connected to an axle extending transversely of said leaf spring assembly at a position intermediate the first and second ends of said leaf spring assembly. The end of each spring comprises a spring eye, also termed an eye wrap.

According to the invention, the leaf spring assembly comprises two individual leaf springs arranged side-by-side with a predetermined, spacing and extending between said first and second ends. The individual leaf springs are preferably identical parabolic leaf springs.

The leaf spring assembly is arranged to replace a conventional single leaf spring, where the total width of the leaf spring assembly is equal to the width of the conventional single leaf spring. In this way the leaf spring assembly can be mounted to existing first and second brackets, with a minimum of modification. In this context, a single leaf spring, is defined as one solid leaf spring extending between said brackets, while a leaf spring assembly is defined as a pair of spaced and substantially parallel, individual leaf springs. The leaf spring assembly according to the invention preferably comprises parabolic springs, where the width and height of each parabolic spring can vary along its extension.

The individual leaf springs have a predetermined spacing and a width selected to provide a predetermined total width of the leaf spring assembly. The spacing can be constant or vary along the length of the leaf spring assembly. For instance, the spacing can vary depending on the selected edge radius and cross-section of the individual leaf springs. Preferably, the individual leaf springs has a width, thickness and spacing at any position along their extension between the spring eyes, selected so that the combined second moment of inertia of the leaf spring assembly is at least equal to that of a single leaf spring with the same total width at the same position.

The second moment of area Ixt; Iyt in the x- and y-planes through a central longitudinal axis for a single, solid leaf spring with a rectangular cross section is defined as:

$$I_{x1} = \frac{b_1 h_1^3}{12} \quad (1)$$

$$I_{y1} = \frac{h_1 b_1^3}{12} \quad (2)$$

where bi is the width and is height, or thickness, of the solid leaf spring.

For a spring assembly according to the invention, second moment of area I&, ly2 is defined as:

$$I_{x2} = 2 \times \frac{b_2 h_2^3}{12} \quad (3)$$

$$I_{y2} = 2 \times \left( \left( \frac{h_2 b_2^3}{12} \right) + (b_2 h_2 e_2^2) \right) \quad (4)$$

$$\text{where } e_2 = \left( \frac{b_1}{2} \right) - \left( \frac{b_2}{2} \right) \quad (5)$$

where b2 is the width and h2 is height, or thickness, of each of the two individual leaf springs.

Figure 6:
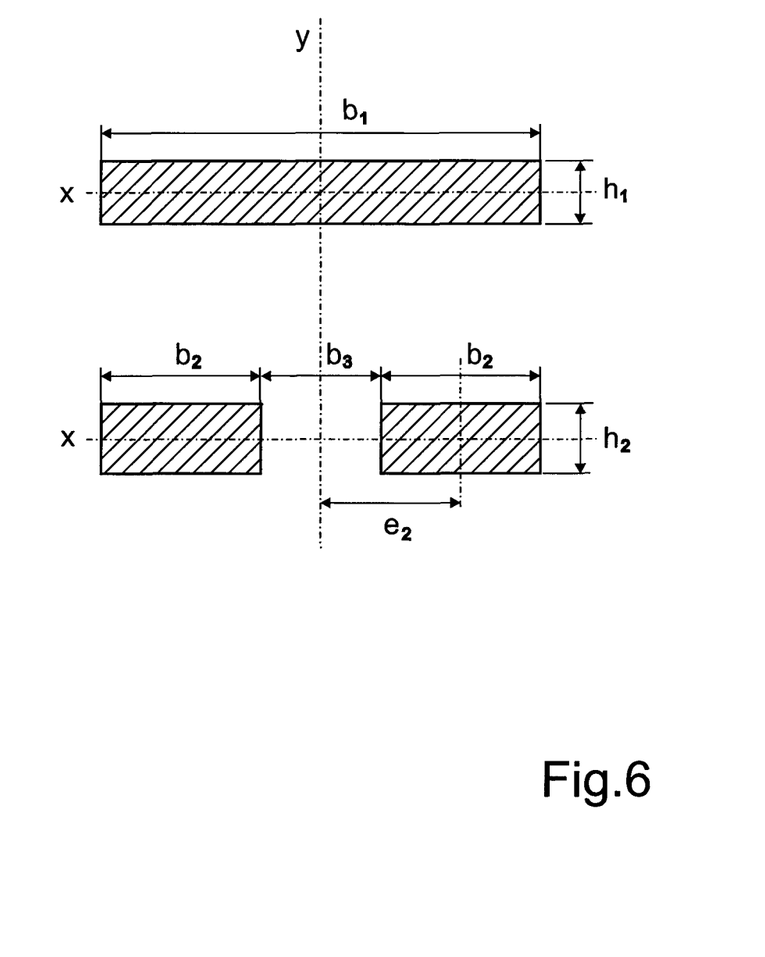
FIG. 6 shows schematic cross-sections in a vertical plane, at right angles to a main direction of a prior art spring and spring assembly according to the present invention.

FIG. 6 shows schematic cross-sections in a vertical plane, at right angles to the main direction of a prior an spring and a spring assembly according to the invention. The above measurements are indicated in the respective cross-section, shown as comprising rectangular shapes for simplicity.

For example, using the above equations (1)-(5), a standard single leaf spring can have a width bi of 100 mm and a thickness \\ of 10 mm. If the standard spring is to be replaced by a spring assembly having, the same total width bi of 100 mm, individual widths b2 of 29 mm and a spacing b3 of 42 mm, then the thickness h2 must be at least 12 mm. In this case the increase in thickness is determined by 1×2, as the side-by-side spring arrangement only has a limited effect on ly2 in the vertical plane. In this example the vertical plane is arranged at the thickest point of a spring assembly comprising two parabolic springs, which point is located adjacent the attachment point of the axle in this case.

Using the above values it can be calculated that I$\chi$2 is marginally larger than lxi while the value for ly2 is 111% of the value for lyi. Also, the total cross-sectional area A2 of the two springs in the spring assembly is only 70% of
the cross-sectional area Ai of the standard spring. Consequently, by using a spring assembly according to the invention the weight saving on each side of the vehicle for the above example is approximately 30%. From this it can be seen that a spring assembly according to the invention can replace a standard solid leaf spring, requiring an increase in thickness limited to a few millimeters. The standard brackets and spring shackles can also be retained. In order to achieve a substantial weight saving without a significant increase in spring thickness, the individual widths b2 of the inventive leaf springs is preferably, but not necessarily, selected in the range of 25% to 45% of the total width bi, more preferably within the range of 30% to 40% of the total width bi. The minimum size of the gap between the individual leaf springs is limited by the size or diameter of a locator pin for maintaining the predetermined spacing between the springs. The locator pin itself can be used as a spacer, or be provided with a cylindrical spacer placed onto the locator pin.

Each individual leaf spring comprises a spring eye, or eye wrap, at the first end the leaf spring assembly and is mounted on a common bushing. The bushing is substantially cylindrical and comprises a central first spacer with a width equal to the predetermined spacing. The first spacer can be in the form of a radial flange which has opposed annular contact surfaces in contact with a side surface of a spring eye on the respective leaf spring.

The individual leaf springs are arranged side-by-side with a predetermined spacing at the intermediate position, separated by second spacer with a width equal to the predetermined spacing. The second spacer is preferably part of an axle assembly used for attaching the transverse axle to the leaf spring assembly.

The invention also relates to a vehicle suspension comprising a pair of leaf spring assemblies arranged to extend longitudinally on opposed sides of a vehicle frame. Each leaf spring assembly has a first end pivotally connected to the vehicle with a first bracket attached rigidly to the frame at a first position. A second end of the leaf spring assembly is connected to the vehicle frame with a spring shackle pivotably connected to a second bracket attached rigidly to the frame at a second position. The spring shackle is provided to compensate for length changes of the leaf spring under load conditions. The suspension further comprises an axle extending transversely of the vehicle frame which axle is mounted to each leaf spring at a position intermediate its first and second ends. A damper means, such as an air spring or suspension strut, is mounted between the axle and the vehicle frame. The leaf spring assembly according to the invention comprises two individual leaf springs arranged side-by-side with a predetermined spacing and extending between said first and second ends.

As stated above, the leaf spring assembly is arranged to replace a conventional single leaf spring, where the total width of the leaf spring assembly is equal to the width of the conventional single leaf spring. The leaf springs of the assembly have a predetermined spacing and width selected to provide a predetermined total width of the leaf spring, assembly. Also, the individual leaf springs have a width and thickness at any position along their extension selected so that the combined second moment of inertia lx; ly of the leaf spring assembly is at least equal to that of a single leaf spring with the same total width at the same position. An example describing the effect of the spaced parallel leaf springs on the mechanical properties of the spring assembly is given above. From the above it can be shown that a spring assembly according to the invention can replace a standard solid leaf spring, requiring an increase in thickness limited to a few millimeters. The standard brackets and spring, shackles can thus be retained, allowing modification of existing vehicles.

Each individual leaf spring comprises a spring eye at the first end the leaf spring assembly, and that each spring eye is mounted on a common bushing comprising a central first spacer with a width equal to the predetermined spacing. The individual leaf springs are arranged side-by-side with a predetermined spacing at the intermediate position, separated by second spacer forming part of an axle assembly connecting the axle to the leaf spring assembly.

The invention is also related to a vehicle provided with a suspension comprising at least one leaf spring assembly as described in the above examples.

A vehicle comprising a suspension provided with a leaf spring assembly according to the invention does not require to be secured by a safety system or safety device at each end. This is required for a standard leaf spring in case of spring failure. For a steered front axle, the safety eye provided at the front end to block to front axle dislocation can be eliminated. Similarly, the steel belt or blocker provided at the rear end can be dispensed with. By eliminating this safety system both cost and weight can be decreased.

A spring breakage in a spring assembly according to the invention will still leave one individual leaf spring intact. In this way, an axle dislocation that would normally lead to problems to maintain steering control after a standard leaf spring breakage can be avoided. After a spring breakage the vehicle can still be driven and can make its own way to a service facility.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION

Figure 1:
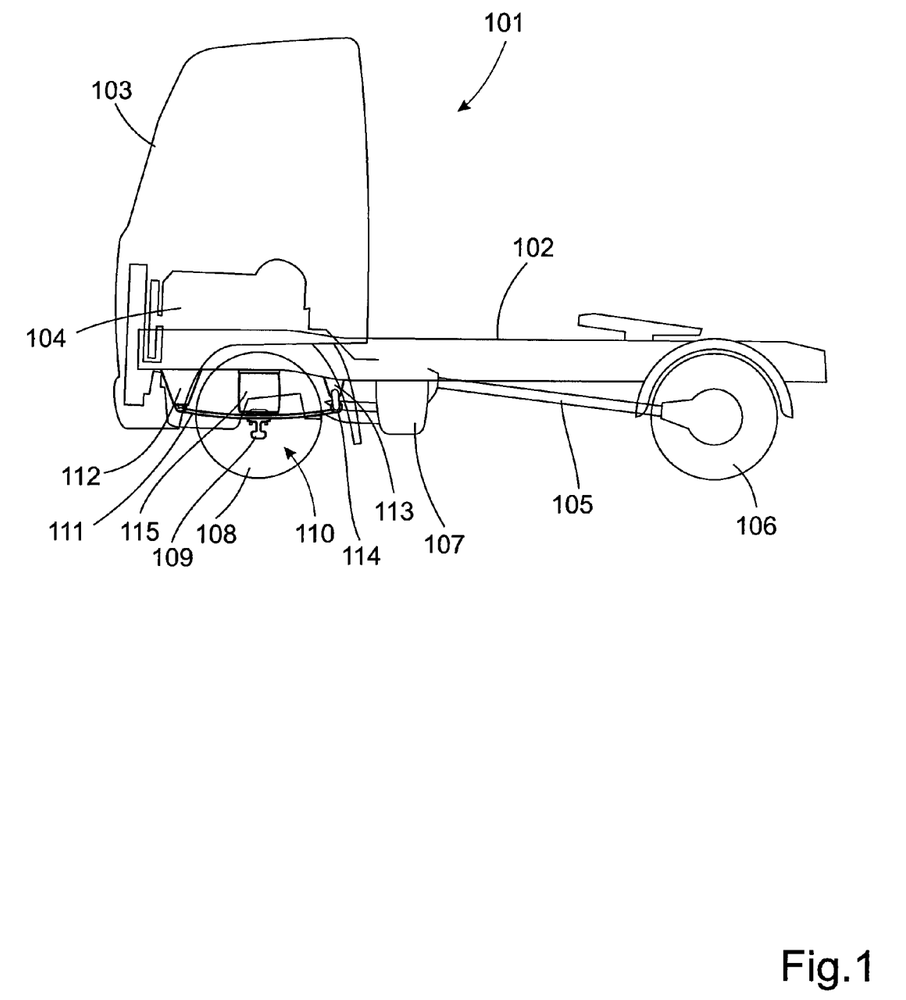
FIG. 1 shows a schematic commercial vehicle suspension with a leaf spring assembly according to the invention.

FIG. 1 shows a schematic commercial vehicle 101 in the form of a tractor unit. The commercial vehicle 101 comprises a chassis 102 and a driver's cab 103 mounted on the chassis. Underneath the driver's cab 103 is an internal combustion engine 104, which acts on a pair of drive wheels 106 of the commercial vehicle 101 by way of a drive train 105 comprising a clutch and a manual transmission or an automatic transmission. The internal combustion engine 104 comprises an exhaust gas system 107 with a first and a second muffler connected to a tailpipe (not shown) which expels the exhaust gases to the atmosphere. The cab 103 is also supported by a pair of steerable front wheels 108. The steerable wheels are mounted on a rigid axle 109 attached to a suspension arrangement 110. The suspension arrangement 110 comprises a leaf spring assembly 111 according to the invention supported by a front bracket 112 and a rear bracket 113 with a spring shackle 114. In the example shown in FIG. 1 the spring assembly is connected to the frame 102 by an air spring or bellows 115. The suspension arrangement will be described in further detail below.

Figure 2A:
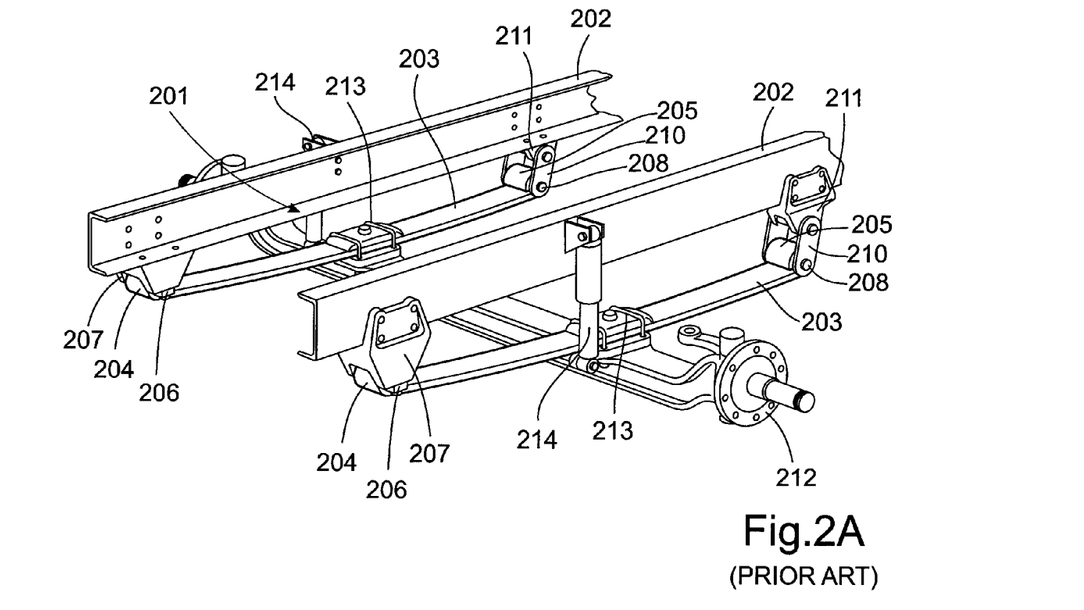
FIG. 2A shows a schematic perspective view of a prior art vehicle front suspension with a standard leaf spring.

FIG. 2A shows a schematic perspective view of a vehicle front suspension 201 comprising a standard prior art single leaf spring on opposite sides of a vehicle frame 202. Identical and/or mirrored components provided on opposite sides of the frame have been given the same reference number. The suspension on the near side of the frame is described below.

The figure shows a flat leaf spring front suspension 201 provided with a solid single leaf spring 203 with a front eye wrap 204 and a rear eye wrap 205. The front eye wrap 204 is connected to a spring hanger connection 206, which is attached to a spring hanger 207 attached to the frame 202. The rear eye wrap 205 is connected a spring shackle connection 208, which is attached to a spring shackle 210 connected to a spring shackle attachment 211. The spring shackle attachment 211 is attached to the frame 202. A rigid front steerable axle 212 is attached to the single leaf spring 203 by an axle attachment 213. The flat leaf spring front suspension 201 shown in FIG. 2A is provided with a damper element 214, which damper element 214 is connected to the frame 203 and to the solid front steerable axle 212 at or near the axle attachment 213. The figure shows a damper element in the form of a suspension strut, but a bellows can also be used.

Figure 2B:
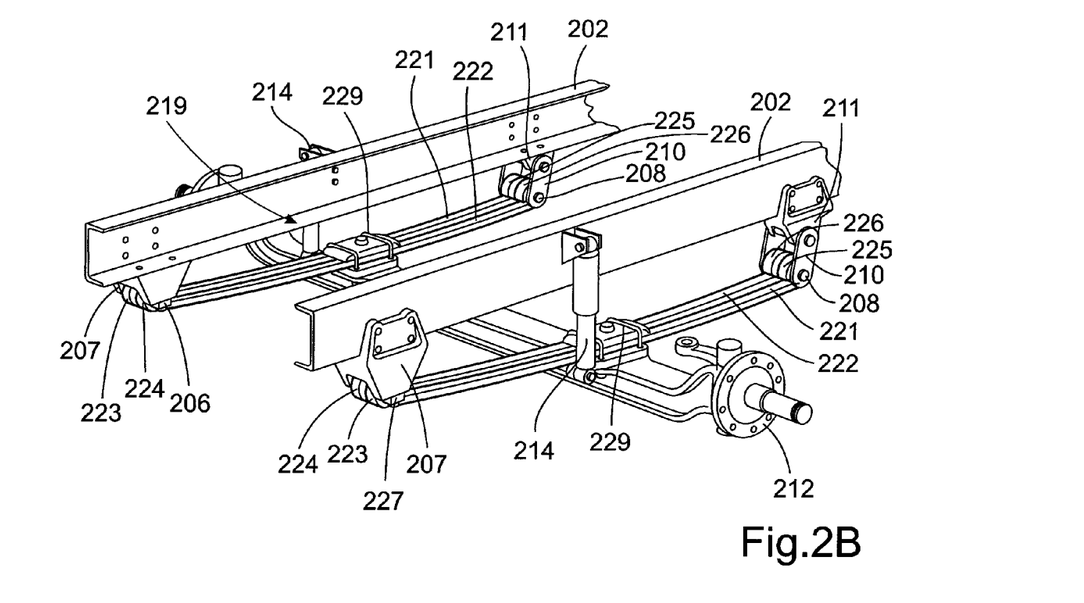
FIG. 2B shows a schematic perspective view of a vehicle front suspension with a leaf spring assembly according to the invention.

FIG. 2B shows a schematic perspective view of a vehicle front suspension 219 comprising a spring assembly according to the invention on opposite sides of a vehicle frame 202. Identical and/or mirrored components provided on opposite sides of the frame have been given the same reference number. Also, component parts used in common with the front suspension 201 in FIG. 2A share the same reference number. The suspension on the near side of the frame is described below.

The figure shows a vehicle spring front suspension 219 provided with a leaf spring assembly comprising two individual leaf springs 221, 224 arranged side-by-side with a predetermined spacing. The parallel leaf springs 221, 222 each have a front eye wrap or spring eye 223, 224 and a rear eye wrap or spring eye 225, 226. The front eye wraps 223, 224 are connected to a common spring hanger connection 227, which is attached to a spring hanger 207 attached to the frame 202. The spring hanger connection will be described in further detail in connection with FIGS. 3A-3C. The rear eye wraps 225, 226 are connected a common spring shackle connection 208, which is attached to a spring shackle 210 connected to a spring shackle attachment 211. The spring shackle attachment or bracket 211 is attached to the frame 202. A rigid from steerable axle 212 is attached to the individual leaf springs 221, 222 by an axle attachment 229. The axle attachment will be described in further detail in connection with FIG. 4. The leaf spring front suspension 219 shown in FIG. 2B is provided with a damper element 214, which damper element 214 is connected to the frame 203 and to the solid front steerable axle 212 at or near the axle attachment 229. The figure shows a damper element in form of a suspension strut, but an air spring or bellows can also be used.

Referring now to FIGS. 2A and 3A-3C, the respective front end of the individual leaf springs 221, 222 are each attached to a common spring hanger connection 227. The front eye wrap or spring eye 223, 224 of each individual leaf spring 221, 222 is attached around a pivot bushing 301 in the spring hanger connection 227. The spring hanger connection 227 is connected to a spring hanger 207 attached to frame 202. The pivot bushing 301 is disposed between individual leaf springs 221, 222 and the spring hanger 207 to accommodate motion between these two components and to isolate the vehicle from shock.

While the present invention is being illustrated as having only one pivot bushing 301 disposed between individual leaf springs 221, 222 and frame 202, it is within the scope of the present invention to have two or possibly three or more pivot bushings disposed between individual leaf springs 221, 222 and frame 202 if desired. In addition, while the present invention is being described as possibly having three identical pivot bushings 301 disposed between individual leaf springs 221, 222 and frame 202, it is within the scope of the present invention to use a different design for each bushing position if desired.

Figure 3A:
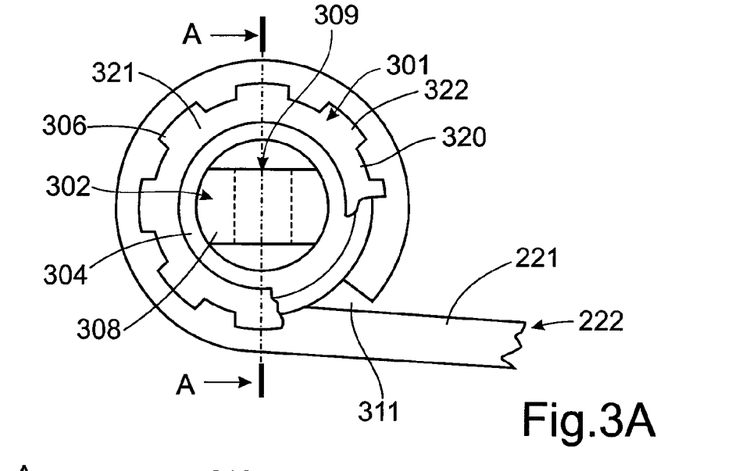
FIG. 3A shows to schematic side view of a spring hanger attachment for a front end of a leaf spring assembly.
Figure 3B:
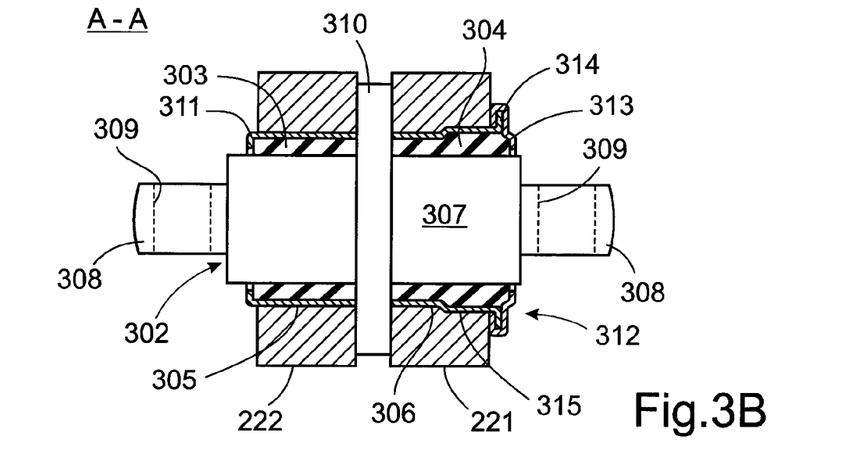
FIG. 3B shows a schematic cross-section of the spring hanger attachment in FIG. 3A.
Figure 3C:
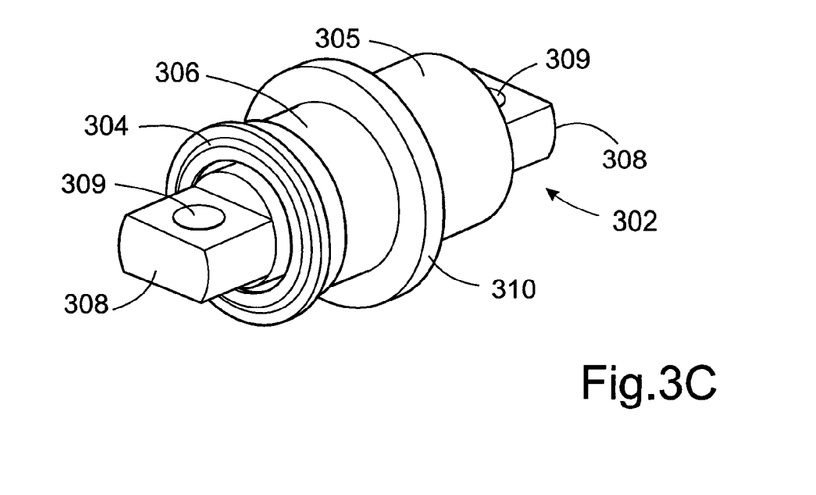
FIG. 3C shows a perspective view of the spring hanger attachment in FIG. 3A.

The spring hanger attachment being illustrated in FIGS. 3A-3C is intended for a front end of the spring assembly, which is connected to the frame 202 by a spring hanger 207. However, the solution can also be used for the rear end of the spring assembly, which is connected to the frame 202 by a shackle 210 disposed between the rear loops of the individual leaf springs 221, 222 and a spring shackle attachment 211 connected to the frame 202.

The spring hanger connection 227 referred to in FIG. 2B is provided with a pivot bushing 301 comprising an inner metal component 302 and a pair of elastomeric bushings 303, 304 with associated outer metal sleeves 305, 306. Inner metal component 302 includes a generally cylindrical centre section 307 and a pair of generally rectangular sections 308, one section 308 being disposed at each end of the centre section 307. Each rectangular section 308 has an aperture 309 extending through it which is used to secure pivot bushing 301 to the appropriate spring hanger connection, or spring hanger bracket. The centre section 307 is provided with a central radial flange 310, which forms a spacer. The width of the radial flange 310 is equal to the desired spacing, between the individual leaf springs 221, 222. Also, the radial extension of the radial flange 310 is preferably equal to or less than the thickness of the adjacent sections of the individual leaf springs 221, 222. The radial flange can be a part of a forged centre section or comprise a separate ring-shaped component welded or otherwise attached to the centre section. While the centre section 307 is illustrated as a solid generally cylindrical section, it is within the scope of the present invention to utilize a tubular inner metal design, a ball shaped pin or any other design, if desired. If a tubular inner metal is used, generally rectangular sections 308 can be eliminated and a through bolt can be used to secure the pivot bushing to the frame. In this case the flange can comprise a separate ring-shaped component as indicated above.

The elastomeric bushings 303, 304 are annular members which are located between the inner metal component 302 and their respective outer metal sleeve 305, 306 on either side of the radial flange 310. The free diameter of elastomeric bushings 303, 304 is larger than the space between inner metal component 302 and outer metal sleeves 305, 306 such that a specified percent compression is applied to the elastomeric bushings 303, 304 when assembled into the pivot bushing 301. The assembly of the pivot bushing 301 can be accomplished by first bonding elastomeric bushings 303, 304 to the inner metal component 302 on either side of the flange 310 and then inserting this combination into each outer metal sleeves 305, 306. Another method of assembling pivot bushing 301 would be to first bond elastomeric bushings within each outer metal sleeve 305, 306 and then inserting the inner metal component 302 into the respective elastomeric bushing 303, 304. The present invention can use either method of assembly. The elastomeric bushings can be bonded to either the inner metal component 302 or the outer metal sleeves 305, 306, it can be bonded to both inner metal component 302 and the outer metal sleeves 305, 306 or it can be assembled to inner metal component 302 or outer metal sleeve 305, 306 without bonding.

According to a first example, each outer metal sleeve 305 is part of a cup shaped body, as indicated on the left hand side of the flange 310 in FIG. 3B. In this case, two identical and opposed cup shaped bodies would be assembled onto the inner metal component 302 with the elastomeric bushings 303, 304 from opposite ends of said inner metal component 302. The cup shaped bodies are formed by the outer metal sleeve 305 and a radial wall 311 located at the outer, opposed ends of the respective outer metal sleeves 305. The radial wall 311 extends towards, but not into contact with, the centre section 307.

According to a second example, shown in FIG. 3B, the outer metal sleeves 305, 306 are part of a first and a second cup shaped body on opposite sides of the flange 310. The first cup shaped body comprises a first sleeve in the form of the outer metal sleeve 305 and a radial wall 311 located at the outer end of the outer metal sleeves 305. The radial wall 311 extends towards, but not into contact with, the centre section 307. The first cup shaped body encloses the first elastomeric bushings 303. The second cup shaped body comprises a second sleeve 306 and a cover 312 in the form of an annular wall 313 which has an outwardly extending flange 314 at the outer end of the second sleeve 306. The second sleeve 306 can also include an optional stepped portion 315 adjacent its outer end in order to compensate for spring distortion. The cup shaped body 306, 313 is assembled over the second elastomeric bushing 304. Because the flange 314 extends outwardly, the elastomeric bushing 304 can be assembled from this flanged end. The outwardly extending flange 314 is formed prior to the assembly of the cup shaped body 306, 313 and the second elastomeric bushing 304. The flanged end of the cup shaped body 306, 313 allows the assembly of the cup shaped body and the elastomeric bushing 304. Once these two components are assembled, the cover 312 is secured to the outwardly extending flange 314 to complete the encapsulation of the elastomeric bushing 304.

The annular wall 313 has a ring portion 320, a contoured portion 321 and a plurality of radially outwardly extending crimp portions 322. The ring portion 320 is disposed adjacent the flange 314 and the crimp portions 322 are bent around flange 314 as shown in FIG. 3B to secure the annular wall 313 to the second sleeve 306 to form the cup shaped body. The contoured portion 321 provides the mating surface to the elastomeric second bushing 304 and will thus control the spring rate for the pivot bushing 301 by controlling the encapsulation and the deformation of the elastomeric bushing 304. Another advantage associated with the pivot bushing 301 is that axial motion of the pivot bushing 301 with respect to the individual leaf springs 221, 222 is limited in one direction due to flange 314 and cover 312. Because the axial loading for a pivot bushing is significantly higher in one direction, the pivot bushing 301 can be assembled to the individual leaf springs 221, 222 in the appropriate direction in such a way that the flange 314 and the cover 312 can resist the significantly higher axial loading.

When adapting the front leaf spring attachment from fitting a standard single leaf spring to fitting a leaf spring assembly according to the invention, it is merely required to replace the standard spring hanger connection with a spring, hanger connection as shown in FIGS. 3A-3C. As indicated above, this spring hanger connection can also be used for the rear leaf spring attachment.

Figure 4:
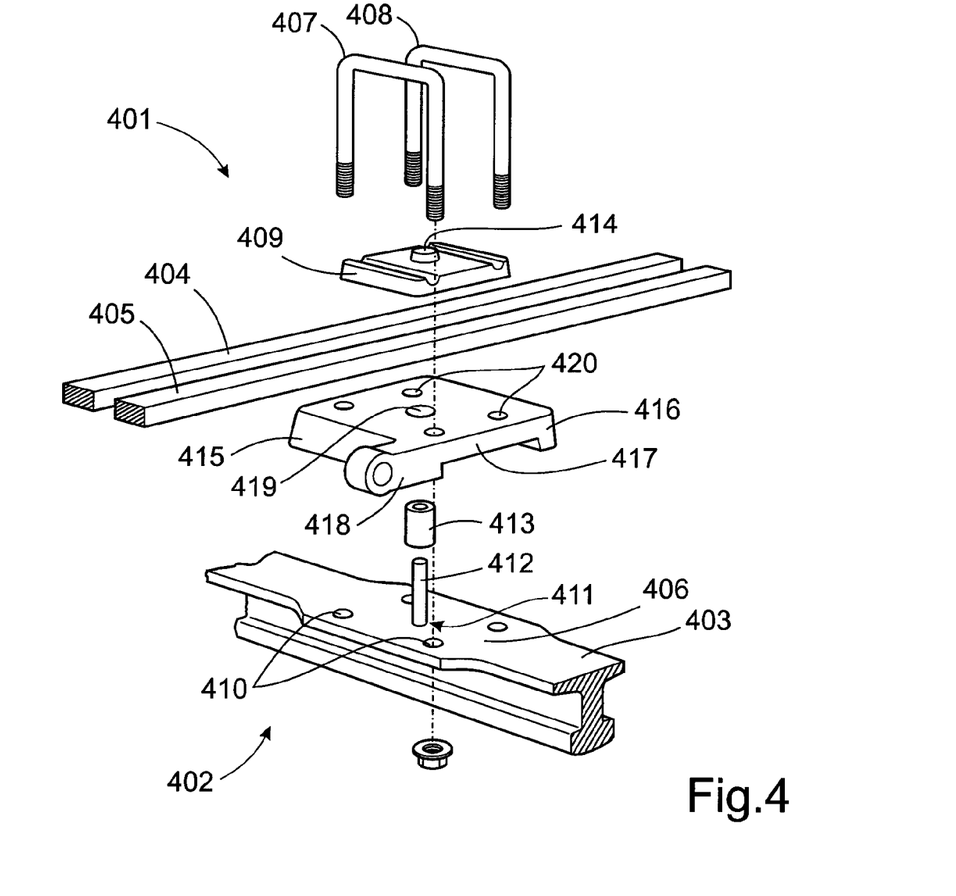
FIG. 4 shows a schematic exploded perspective view of an axle attachment a leaf spring assembly according to the invention.

FIG. 4 shows an exploded perspective view of an axle attachment 401 for an axle assembly 402 connected to a leaf spring assembly according to the invention. The axle assembly is intended for a commercial vehicle with single a front axle 403 having a leaf spring assembly comprising a pair of spaced parallel leaf springs 404, 405 on each side (one shown) of a vehicle frame (see FIG. 2B). The axle 403 preferably has an enlarged mounting pad 406 in the area adjacent the end of the axle. The basic purpose for the pad 406 is to provide a mounting location for the leaf springs 404, 405. Since the weight of a truck, is resting on the springs 404, 405, the pad 406 is basically receiving a weight bearing load. As is well-known, U-bolt clamps 407, 408 are adapted to engage a spring block 409 on top of the springs 404, 405 and damp the parts together.

The U-bolts clamps 407, 408 pass through corresponding apertures 410 in the pad 406 with a loose fastener fit and are fastened by nuts (not shown) at the underside of the pad 406. All the U-bolts 407, 408 are intended to ensure the springs stay centred on the pad 406 and are clamped down to prevent relative movement. There is no critical locating function associated with the U-bolts 407, 408. The upward force of the truck body against the U-bolts 407, 408 acting through the spring 404, 405 is limited to relatively minor upward momentum and centrifugal forces as the truck moves over bumps and around curves.

A single locating aperture 411 is formed in the standard axle 403 at the pad 406. This is used to allow the springs 404, 405 to be located with respect to the pad 406 during assembly. A locating pin 412 mounted in the aperture 411 extends upwards from the pad 406 and is fitted with a cylindrical spacer 413 placed onto the locating pin 412. A bumper 414 is provided on the top of the spring block 409 for absorbing the shock in the event that the vehicle load causes the springs 404, 405 to bottom out. The axle attachment 401 further comprises a mounting plate 415 with front and rear skirt portions 416, 417, respectively, extending downwards into contact with the front and rear surfaces of the pad 406. In the example shown, the mounting plate 415 is provided with an attachment 418 for a suspension strut ("214"; FIG. 2B), but it would also be possible to use an air spring for this purpose.

Located centrally in the mounting plate 415 is a locating aperture 419 aligned with the central aperture 411 on the mounting pad 406. The pin 412 is made from hardened steel and has a shear modulus high enough to hold the pans rigidly together. The size of the pin 412 and the corresponding locating apertures 411, 419 is calculated to the size of the loading on the axle assembly. The U-bolt clamps 407, 408 extend through the apertures 420 in the plate 415 with a loose fastener fit to assure ease of assembly of these parts. The upper spring block 409 and the U-bolt clamps 407, 408 are not required to perform any resisting function and thus can be standard parts previously used.

In assembling the leaf springs 404, 405 on a standard axle 403, the mounting, plate 415 is placed over the locating pin 412 and the cylindrical spacer 413. The locating pin 412 and the cylindrical spacer 413 will extend out of the locating aperture 419 into a predetermined spacing between the parallel leaf springs 404, 405. The upper surface of the cylindrical spacer 413 is preferably located level with or below the upper surface of the respective spring 404, 405. The locating pin 412 extends upwards from the pad 406 level with or above the upper surface of the cylindrical spacer 413. In the latter case, a recess is provided in the lower surface of the spring block 409. The cylindrical spacer 413 can be attached to the locating pin 412 by means of a force fit or by means of cooperating threads.

Alternatively, the cylindrical spacer can be placed onto the locating pin and into contact with the upper surface of the plate. According to a further alternative, the cylindrical spacer can be an integral part of the plate.

When adapting axle attachment 401 from fitting a standard single leaf spring to fitting a leaf spring assembly according to the invention, it is merely required to enlarge the locating aperture in the mounting, plate and to attach the cylindrical spacer to the locating pin.

Figure 5:
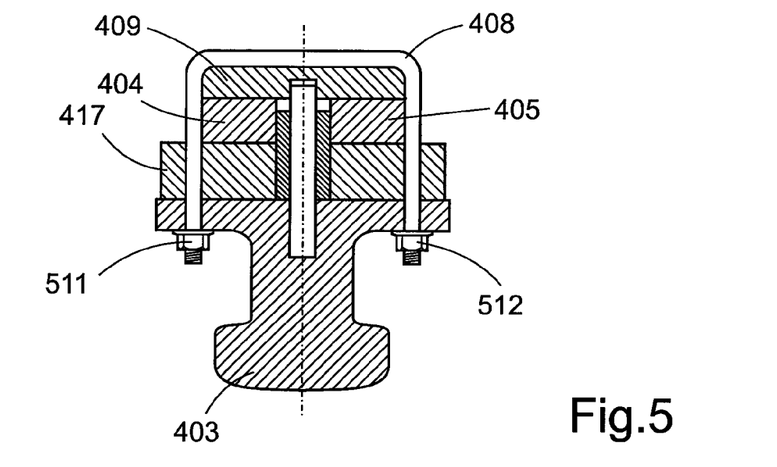
FIG. 5 shows a cross-section through the axle attachment in FIG. 4.

FIG. 5 shows a cross-section through the axle assembly 401 between the U-bolt clamps 407, 408. The figure shows the U-bolt clamps 407, 408 holding the spring block 409, the leaf springs 404, 405 and the plate 415 onto the axle 403. The U-bolt clamps 407, 408 are fastened by nuts 511, 512 at the underside of the pad 406. The components are located by the locating pin 412 and the cylindrical spacer 413. The locating pin 412 extends upwards into a recess is provided in the lower surface of the spring block 409. The cylindrical spacer 413 is located immediately below the upper surface of the respective spring 404, 405.

The invention is not limited to the above embodiments, but may be varied freely within the scope of the appended claims.

The invention claimed is:

1. A vehicle suspension leaf spring assembly arranged to be mounted in the longitudinal direction of the vehicle, on both sides thereof, the leaf spring assembly having a first end, which is arranged for pivotal connection to a first bracket on the vehicle; and a second end, which is arranged for connection to a spring shackle on the vehicle, wherein the leaf spring assembly is arranged to be connected to an axle extending transversely of the leaf spring assembly at a position intermediate the first and second ends of the leaf spring assembly, wherein the leaf spring assembly comprises two individual leaf springs arranged side-by-side with a predetermined spacing and extending between the first and second ends, wherein the vehicle suspension leaf spring assembly further comprises a locator pin for maintaining the predetermined spacing between the springs.

2. The leaf spring assembly according to claim 1, wherein the leaf spring assembly is arranged to replace a single leaf spring, where the total width of the leaf spring assembly is equal to the width of the single leaf spring.

3. The leaf spring assembly according to claim 1, wherein each individual leaf spring has a predetermined width selected within the range 25% to 45% of the total width of the leaf spring assembly.

4. The leaf spring assembly according to claim 1, wherein the individual leaf springs have a width and thickness at any position along their extension selected so that the second moment of inertia of the leaf spring assembly in the vertical and horizontal planes is at least equal to that of an individual leaf spring with the same total width.

5. The leaf spring assembly according to claim 1, wherein each individual leaf spring comprises a spring eye at the first and second ends of the leaf spring assembly, and that each spring eye is mounted on a common bushing comprising a central first spacer with a width equal to the predetermined spacing.

6. The leaf spring assembly according to claim 1, wherein the individual leaf springs are arranged side-by-side with a predetermined spacing at the intermediate position, separated by second spacer with a width equal to the predetermined spacing.

7. A vehicle suspension comprising a pair of leaf spring assemblies arranged to extend longitudinally on opposed sides of a vehicle frame, each leaf spring assembly having a first end pivotally connected to the vehicle with a first bracket attached rigidly to the frame at a first position; and a second end connected to the vehicle frame with a spring shackle pivotably connected to a second bracket attached rigidly to the frame at a second position, in order to compensate for length changes of the leaf spring under load conditions, the suspension further comprising an axle extending transversely of the vehicle frame which axle is mounted to each leaf spring at a position intermediate its first and second ends, and a damper means mounted between the axle and the vehicle frame, wherein the leaf spring assembly comprises two individual leaf springs arranged side-by-side with a predetermined spacing and extending between the first and second ends, wherein the vehicle suspension leaf spring assembly further comprises a locator pin for maintaining the predetermined spacing between the springs.

8. The vehicle suspension according to claim 7, wherein the leaf spring assembly is arranged to replace a single leaf spring, where the total width of the leaf spring assembly is equal to the width of the single leaf spring.

9. The vehicle suspension according to claim 7, wherein each individual leaf spring has a predetermined width selected within the range 25% to 45% of the total width of the leaf spring assembly.

10. The vehicle suspension according to claim 7, wherein the individual leaf springs have a width and thickness at any position along their extension selected so that the second moment of inertia of the leaf spring assembly in the vertical and horizontal planes is at least equal to that of a single leaf spring with the same total width at the same position.

11. The vehicle suspension according to claim 7, wherein each individual leaf spring comprises a spring eye at the first end of the leaf spring assembly, and that each spring eye is mounted on a common bushing comprising a central first spacer with a width equal to the predetermined spacing.

12. The vehicle suspension according to claim 7, wherein the individual leaf springs are arranged side-by-side with a predetermined spacing at the intermediate position, separated by second spacer forming part of an axle attachment connecting the axle to the leaf spring assembly.

13. Vehicle, wherein the vehicle is provided with a suspension according to claim 7.

* * * * *